United States Patent
Nishinou

(10) Patent No.: US 6,490,412 B1
(45) Date of Patent: Dec. 3, 2002

(54) CAMERA

(75) Inventor: Naoyuki Nishinou, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/830,965

(22) PCT Filed: Nov. 9, 1999

(86) PCT No.: PCT/JP99/06231

§ 371 (c)(1),
(2), (4) Date: May 3, 2001

(87) PCT Pub. No.: WO00/28376

PCT Pub. Date: May 18, 2000

(30) Foreign Application Priority Data

Nov. 9, 1998 (JP) .......................................... 10-317069

(51) Int. Cl.$^7$ .............................................. G03B 17/50
(52) U.S. Cl. ............................. 396/30; 396/34; 396/36; 396/284
(58) Field of Search ............................. 396/30, 31, 32, 396/33, 34, 36, 37, 40, 284

(56) References Cited

U.S. PATENT DOCUMENTS 3,653,313 A * 4/1972 Leduc ........................ 396/284
3,930,264 A * 12/1975 Asano ........................ 396/30
4,736,215 A * 4/1988 Hudspeth et al. ........... 396/207
6,173,120 B1 * 1/2001 Takatori ....................... 396/36

FOREIGN PATENT DOCUMENTS

| JP | 49-127617 | 12/1974 | |
| JP | 62-205331 | 9/1987 | ........... G03B/42/02 |
| JP | 63-138321 | 6/1988 | ........... G03B/17/52 |
| JP | 2-216142 | 8/1990 | ........... G03B/3/00 |
| JP | 8-50239 | 2/1996 | ........... G02B/13/08 |
| JP | 10-69031 | 3/1998 | ........... G03C/3/00 |

* cited by examiner

Primary Examiner—David M. Gray
(74) Attorney, Agent, or Firm—Sughrue Mion, PLLC

(57) ABSTRACT

An object of the present invention is to provide a camera capable of exactly displaying the number of residual films, even if there is concerned with such a situation that at the time when layered films remain in a film pack, the rear cover is opened and the film pack is re-mounted. The operational amplifier 236 is used to detect a current $I_M$ conducting through the feeding motor 214, and the detected current is subjected to the AD conversion by the MPU 220. The display unit 61 displays a predetermined number corresponding to the number of films layered within the film pack having the shielding plate, or a number in which one is subtracted from the number of residual films stored in the storage section 210, according as it is detected that now discharged one is the shielding plate.

6 Claims, 11 Drawing Sheets

| 101 | 102 | FILM SPEED |
|-----|-----|------------|
| L | L | OTHERS |
| L | H | ISO 400 |
| H | L | ISO 800 |
| H | H | ISO 1600 |

CAMERA

TECHNICAL FIELD

The present invention relates to a camera on which a film pack adapted for accommodating layered instant photographic films is mounted.

BACKGROUND ART

Hitherto, there is known a camera on which a film pack adapted for accommodating layered instant photographic films is mounted inside a frame member having an aperture, the film pack having such a structure that the aperture of the frame member being closed by a shielding plate. In such a type of camera, there is one having a display unit for displaying the number of residual films within the mounted film pack wherein when a new film pack is mounted, there is performed an initialization processing such that the displayed content is altered into the number of films accommodated in the new film pack. The shielding plate consists of a plastic member or the like having a sufficient thickness since there is a need to provide a sufficient shielding property so as to protect the layered films from the external light. After an exchange of film packs is performed, for example, at the time when the rear cover is closed, the display unit displays a predetermined number (for example 10) corresponding to the number of films layered within the new film pack, and upon receipt of an electric power from a built-in battery, first the shielding plate is discharged. Thereafter, in accordance with a photographic operation, a top layer of film of the layered films is exposed, so that a developer, which is stored in a part of the exposed film beforehand, is equally diffused in the film to develop and discharged. As a result, the number of residual films is decreased by 1 and then displayed on the display unit.

According to the above-mentioned camera, when the rear cover is closed after an exchange of the film packs, it is always decided that a new film pack is mounted, and the initialization processing is performed. For example, the display unit displays the number of films accommodated in the new film pack. A photographer confirms the photography-possible number of films through an observation of the number of films displayed on the display unit.

There is a case where a photographer performs such an operation that he erroneously opens the rear cover at the time when the layered films still remain in the film pack, and he becomes aware of his error and then immediately closes the rear cover. For example, the above-mentioned operation is performed at the time when five sheets of layered films remain in the film pack, the camera decides, in view of the fact that the film pack is mounted and then rear cover is closed, that a new film pack is mounted. According to such a type of camera, when a sheet of film is discharged from the film pack, the camera decides that the shielding plate is discharged, and although the number of residual films is actually four sheet, the display unit displays the number of residual films '10'. For this reason, the conventional camera is associated with a problem that the number of residual films, which is actually possible to be used for photography, is different from the number of residual films, which is displayed on the display unit.

DISCLOSURE OF THE INVENTION

In view of the foregoing, it is an object of the present invention to provide a camera capable of performing a proper control according to a situation, for example, in such a manner that in the event that at the time when layered films remain in a film pack, the film pack is re-mounted, the number of the residual films is accurately displayed.

To achieve the above-mentioned object, the present invention provides a camera wherein a plurality of instant photographic films are layered, a film pack having a shielding plate for shielding the layered films is loaded, the shielding plate is first discharged by a power of a built-in battery and thereafter a top layer of film of the layered films is exposed in accordance with a photographic operation, and an exposed film is discharged while developed, said camera comprising:

a shielding plate detection section for detecting a presence of the shielding plate of the loaded film pack; and a control section for performing a control in accordance with a detection result by said shielding plate detection section.

According to the camera of the present invention, the presence of the shielding plate of the loaded film pack is detected. This feature makes it possible to distinguish the state in which a new film pack is loaded and the state that a film pack exchange operation is erroneously performed on the film pack involved in photograph on halfway, and then perform a proper control.

In the camera according to the present invention as mentioned above, it is preferable that said shielding plate detection section detects whether one discharged by a present discharge operation is the shielding plate, in accordance with the shielding plate of the loaded film pack or a load at the time of a discharge operation for the film.

The shielding plate is formed by a plastic member or the like having a sufficient thickness, and the material of the shielding plate is larger in hardness and rigidity than the material of the film. For this reason, the load current of the feeding motor at the time of discharge of the shielding plate and the voltage drop due to the internal impedance of the built-in battery are larger than the load current at the time of discharge of the film and the voltage drop. Utilization of this feature makes it possible to detect whether it is concerned with the shielding plate through comparison of magnitude of the load current and the voltage drop. In this case, as shown in the embodiments, which will be described later, it is possible to use a relatively simple circuit structure.

In the camera according to the present invention as mentioned above, it is preferable that the camera further comprises a display unit for displaying a state of the camera, and said control section controls a display content of said display unit in accordance with a detection result by said shielding plate detection section.

As states of the camera, there are raised states of a counter for storing the number of films, a film speed, a lens position, an electronic flash control mode (on/off/auto) as the exposure mode, and an exposure correction (darken/normal/lighten). The control as mentioned above makes it possible to distinguishably display the state of the camera at the time when the new film pack is loaded and the state of the camera in half way of photography.

In the camera according to the present invention as mentioned above, it is preferable that the camera further comprises a display unit for displaying the number of residual films within the loaded film pack, wherein said control section comprises a storage section for storing the number of residual films within the film pack before a film pack exchange operation, and a display control section for causing said display unit to display a predetermined number corresponding to the number of films layered within the film pack having the shielding plate, or a number in which one is subtracted from the number of residual films stored in said storage section, according as said shielding plate detection section detects that now discharged one is the shielding plate, in a case where the film pack exchange operation is made.

The above-mentioned "film pack exchange operation" includes not only the operation wherein the loaded film pack is removed and a new film pack is loaded, but also an operation wherein the loaded film pack is removed and the removed film pack is loaded as it is, and an operation wherein an operation (for example, an operation of opening the rear cover) for removing the film pack is performed, and an operation (for example, an operation of closing the rear cover) for completing the loading of the film pack is performed without removing the film pack.

According to this arrangement, in the event that the shielding plate is discharged, the display unit may display a predetermined number corresponding to the number of films layered in a new film pack. And in the event that a film is discharged, the display unit may display the number in which one is subtracted from the number of residual films stored in the storage section. For this reason, even if it is concerned with such situations that at the time when layered films remains in the film pack, an exchange operation is performed on the film pack, it is possible to exactly display the number of residual films on the display unit, without bringing about, as in the former camera, such a situation that the photography-possible number of residual films is different from the number of residual films displayed on the display unit.

In the camera according to the present invention as mentioned above, it is acceptable that said camera adapts for loading thereonto a film pack recording film information related to an incorporated film, and said camera has a sensor for reading the film information recorded on the film pack, and said control section causes said sensor to read the film information upon receipt of that said shielding plate detection section detects the shielding plate.

Here, the film information related to an incorporated film implies the number of films stored in the film pack, and a film speed.

This arrangement makes it possible to perform a control of a camera in accordance with the film information read by the sensor.

Further, in the camera according to the present invention as mentioned above, it is acceptable that said control section performs an initialization on at least one portion of element of said camera upon receipt of that said shielding plate detection section detects the shielding plate.

Here, it is preferable that "at least one portion of element" referenced above is one or more among a lens position, an electronic flash control mode as the exposure mode, and an exposure correction. Upon receipt of that the shielding plate is detected, the initial setting is performed on "at least one portion of element". This feature makes it possible to enhance an operational efficiency.

As mentioned above, according to the present invention, it is possible to perform a proper control according to a situation, for example, in such a manner that in the event that at the time when layered films remain in a film pack, the film pack is re-mounted, the number of the residual films is accurately displayed.

BEST MODE FOR CARRYING OUT THE INVENTION

Embodiments of the present invention will be described with reference to the accompanying drawings.

Figure 1:
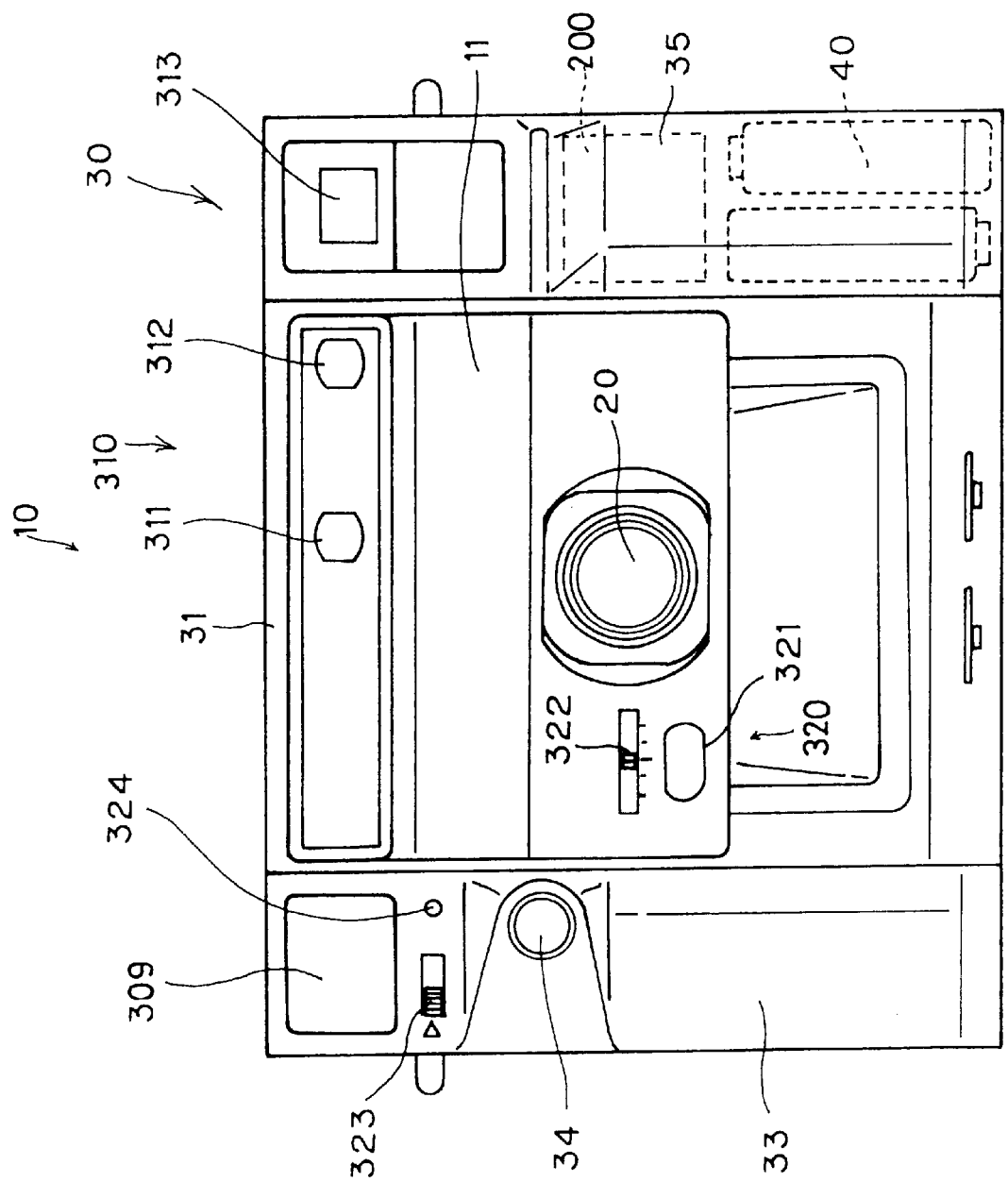
FIG. 1 is a front view showing an external appearance of a camera according to a first embodiment of the present invention.
Figure 2:
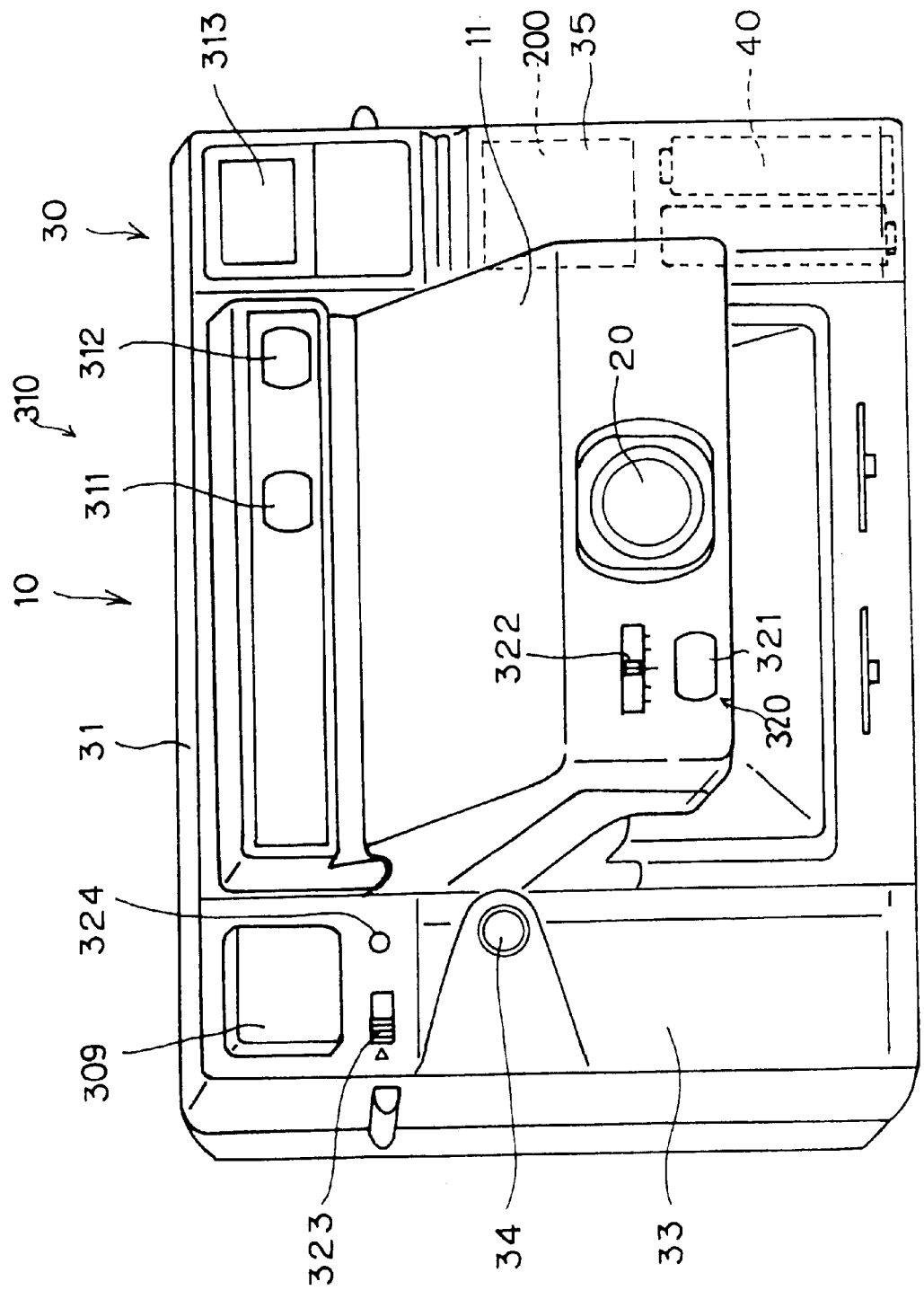
FIG. 2 is a perspective view showing an external appearance of the camera shown in FIG. 1.

FIG. 1 is a front view showing an external appearance of a camera according to a first embodiment of the present invention. FIG. 2 is a perspective view showing an external appearance of the camera shown in FIG. 1.

A camera 10 is an instant camera. To take a photograph, when both edges of a front cover 11 are grasped and picked up, a lens 20 provided at the center of the camera 10 is projected forward in FIG. 1 and diagonally forward in FIG. 2.

On an upper portion 31 of a camera main frame 30, there are provided an electronic flash unit 309 for emitting an electronic flash light, an AF unit 310 comprising an AF light-projection window 311 incorporating therein a light-emitting device for the auto focus (AF) and an AF light receiving window 312 incorporating therein a light receiving element for receiving light from the light-emitting device, and a finder 313. At the left side of a lens 20 in FIGS. 1 and 2, there is provided an AE unit 320. The AE unit 320 has an AE window 321 for transmitting light to a built-in AE sensor for an exposure control. On the upper portion of the AE window 321, there is provided a slide switch 322 for applying a filter effect to the AE window 321. At the lower portion of the electronic flash unit 309, there are provided a slide switch 323 to be used at the time of self-timer photography and a self-window 324 incorporating therein a light-emitting device for emitting light at the time of self-timer photography.

Further, at the left of the front view and the perspective view shown in FIG. 1 and FIG. 2, respectively, there is provided a grip portion 33, which will be held by a photographer at the time of the photography. At the top of the grip portion 33, there is provided a shutter button 34.

Furthermore, also at the right of the front view and the perspective view shown in FIGS. 1 and 2, respectively, there is provided a grip portion 35 inside which there is installed a built-in battery 40 for driving the camera 10. At the top of the built-in battery 40, there is provided a circuit substrate 200 for performing a control of the camera 10 in its entirety. The circuit substrate 200 will be described later. Further, the camera 10 is provided with a feeding motor for feeding a shielding plate for a film pack and a film, which will be also described later.

Figure 3:
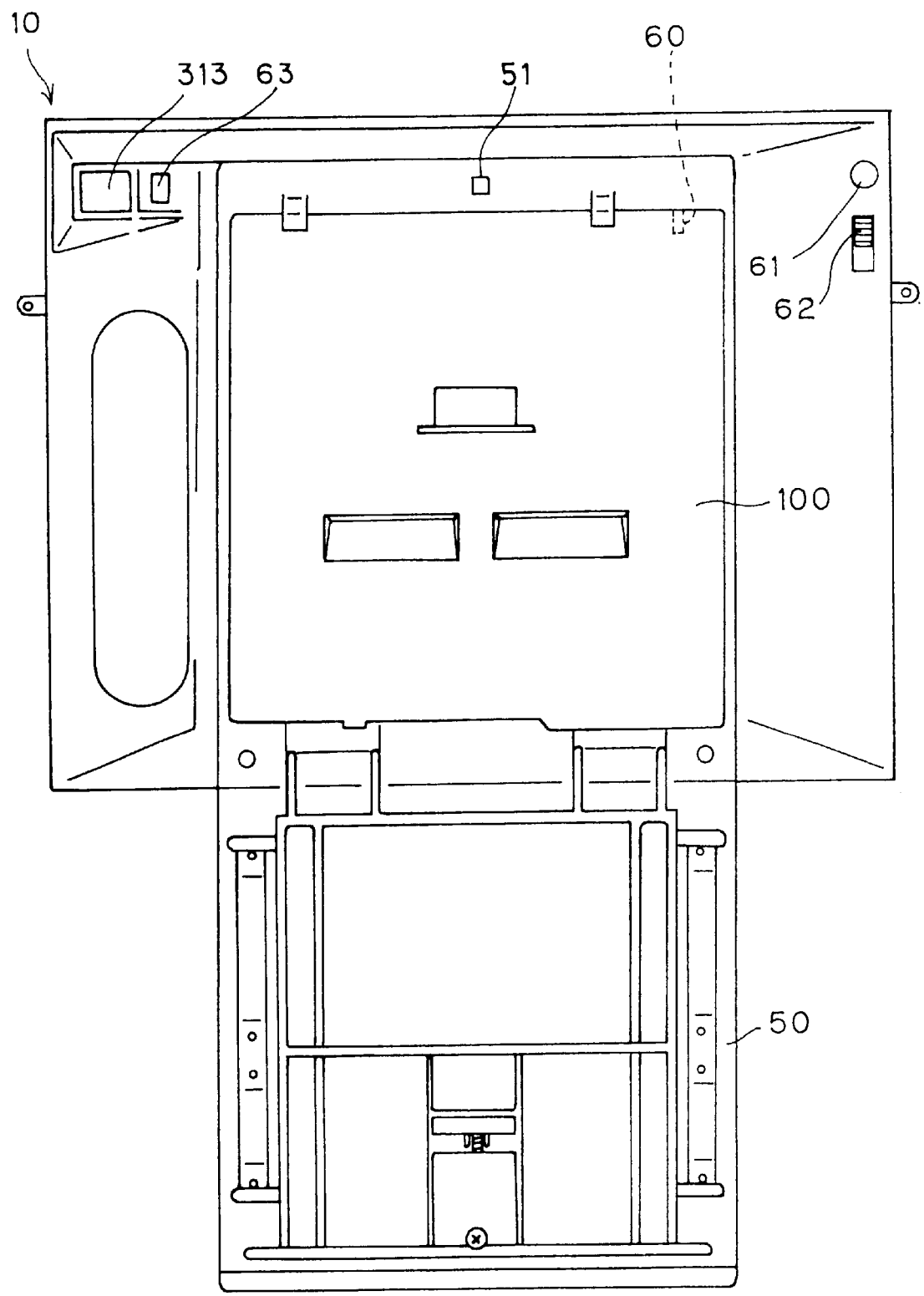
FIG. 3 is a rear elevation of the camera according to the first embodiment in which a rear cover is opened.

FIG. 3 is a rear elevation of the camera according to the first embodiment in which a rear cover is opened.

The camera 10 shown in FIG. 3 shows a state that the rear cover 50 is opened and the film pack 100 is mounted. At the upper right of FIG. 3 as to the camera 10, there is provided a film pack detection switch 60 for detecting whether a film pack 100 is loaded. As shown in FIG. 3, in a state that the film pack 100 is loaded, the film pack detection switch 60 is pushed by the film pack 100 into a turn-on condition. Thus, it is detected that the film pack 100 is loaded. At the upper left of the film pack detection switch 60, there is provided a rear cover switch 51 for detecting whether a rear cover 50 is closed. When the rear cover 50 is closed, the rear cover switch 51 is pushed and turns on. Thus it is detected that the rear cover 50 is closed. Further, at the right of the film pack detection switch 60, there are provided a display unit 61 for displaying the number of residual films within the loaded film pack 100, and an electronic flash charging switch 62 for performing the emission of an electronic flash light. Furthermore, adjacent to the finder 313, there is provided a lamp window 63 for indicating electronic flash charging completion through blinking.

Figure 4:
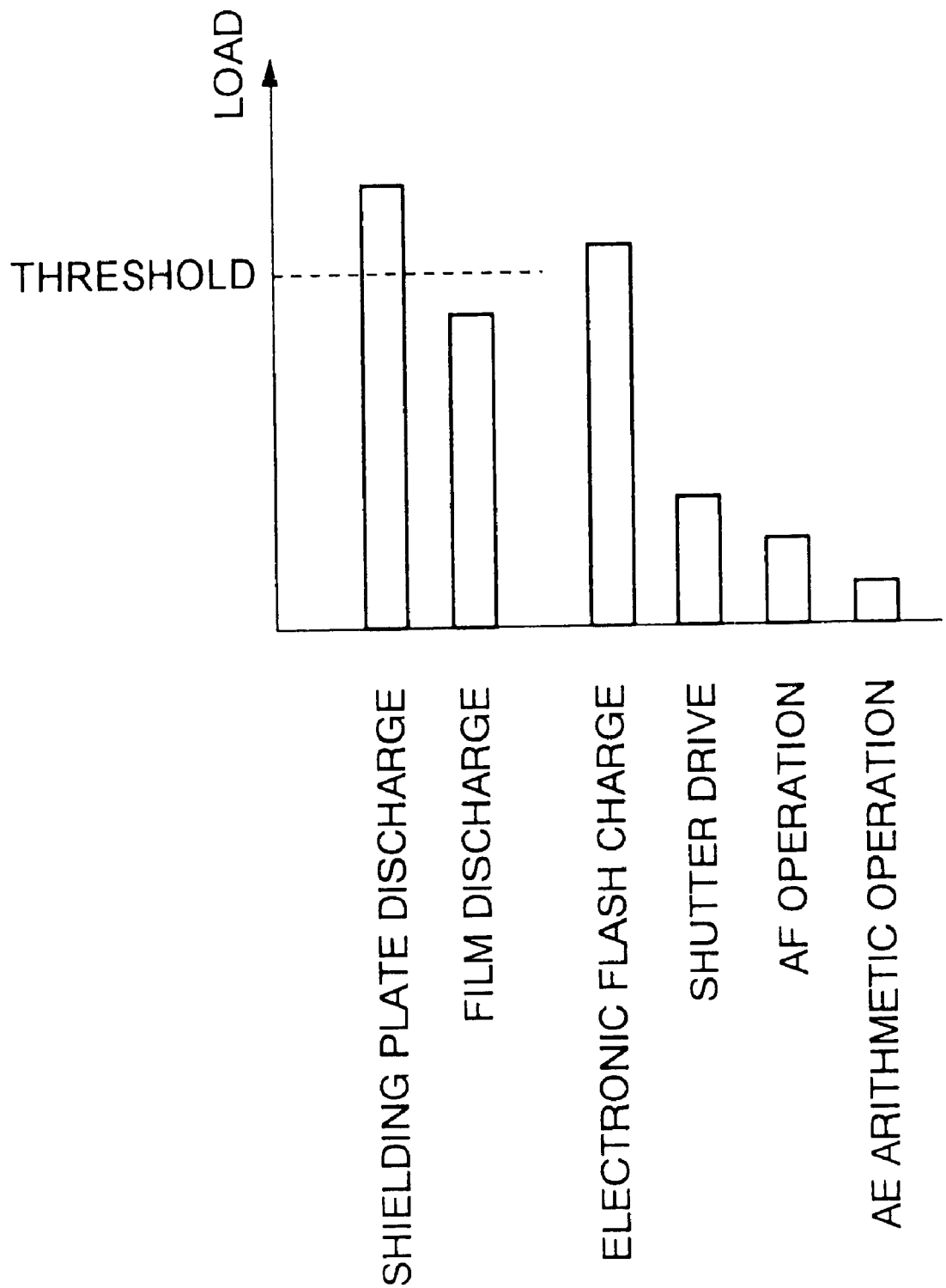
FIG. 4 is a view showing loads in various types of operational sequence of the camera according to the first embodiment, and set up thresholds.

FIG. 4 is a view showing loads in various types of operational sequence of the camera according to the first embodiment, and set up thresholds.

A shield plate discharge sequence is for discharging a shielding plate formed by a plastic member or the like having a sufficient thickness. For this reason, as shown in FIG. 4, the load involved in the shield plate discharge sequence is the largest one of the loads involved in the various types of operational sequences. The film discharge sequence is for transporting a film by a plurality of rollers for instance so that a developer is equally diffused in the film to develop. Accordingly, the film discharge sequence belongs to the larger sort in load of the various sorts of operational sequences. However, the load involved in the film discharge sequence is smaller than the load involved in the shield plate discharge sequence, since the material of the shielding plate is larger in hardness and rigidity than the material of the film discharge sequence. An electronic flash charge sequence needs a large power for performing an electronic flash charge. Accordingly, the electronic flash charge sequence is large in load after the shield plate discharge sequence. Hereinafter, a shutter driving sequence, an AF operational sequence and an AE arithmetic operational sequence are larger in load in the named order. FIG. 4 further shows a threshold set up between the load involved in the shield plate discharge sequence and the load involved in the film discharge sequence. The threshold will be described referring to FIG. 5.

Figure 5:
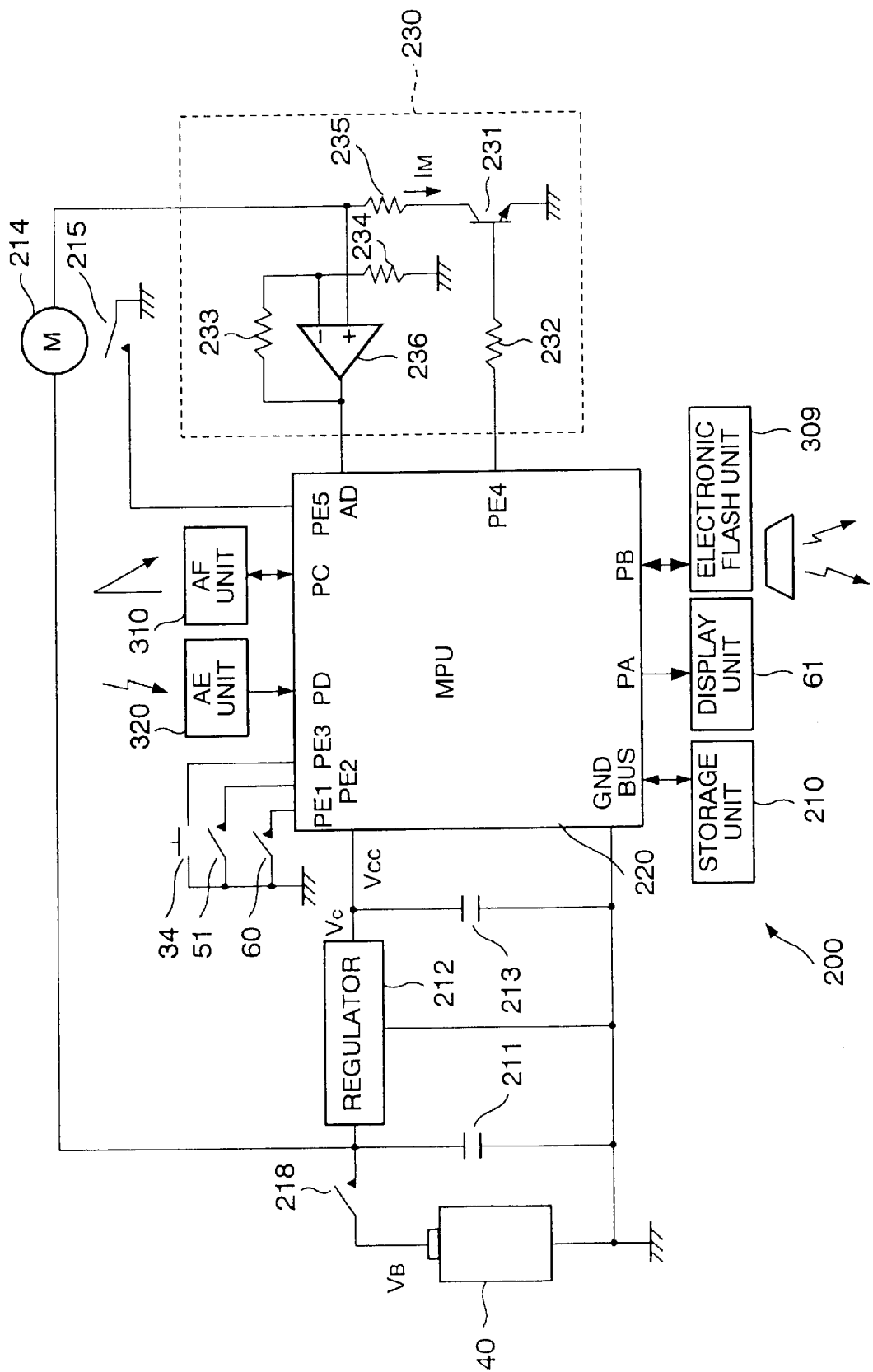
FIG. 5 is a circuit diagram of the camera of the first embodiment.

FIG. 5 is a circuit diagram of the camera of the first embodiment.

In FIG. 5, a power source switch 218 is disposed adjacent to the built-in battery 40. The power source switch 218 is closed when a front cover 11 is raised as shown in FIG. 2.

An MPU 220 is installed in the circuit substrate 200 for performing a control of the camera 10 in its entirety. A storage unit 210 is connected to a bus terminal BUS of the MPU 220. The display unit 61, the electronic flash unit 309, the AF unit 310, and the AE unit 320 are connected to a port PA, a port PB, a port PC and a port PD, respectively. The film pack detection switch 60, the rear cover switch 51, the shutter button 34 are connected to a port PE1, a port PE2 and a port PE3, respectively.

A motor drive section 230 is provided with a transistor 231 for driving a feeding motor 214, and an operational amplifier 236 for detecting a current $I_M$ conducting through the transistor 231. A port PE4 of the MPU 220 is connected to a gate of the transistor 231 via a resistance 232 constituting the motor drive section 230. An emitter of the transistor 231 is connected to the ground GND. A collector of the transistor 231 is connected via a resistance 235 to a non-inverting input of the operational amplifier 236 and the feeding motor 214. An inverting input of the operational amplifier 236 is connected via a resistance 234 to the ground GND, and is connected via a resistance 233 to an output of the operational amplifier 236 and an AD conversion input terminal AD of the MPU 220. A feeding switch 215 is connected to a port PES of the MPU 220. The feeding switch 215 is closed when the feeding motor 214 rotates to discharge the shielding plate or a film.

The storage unit 210 stores the number of residual films in the film pack before an exchanging operation of the film pack 100.

The display unit 61 displays the number of residual films in the loaded film pack 100.

The portion including the operational amplifier 236 and the AD conversion input terminal AD of the MPU 220 corresponds to an example of the shielding plate detection section referred to the present invention. The use of the portion including the operational amplifier 236 and the AD conversion input terminal AD of the MPU 220 makes it possible to detect the presence of the shielding plate of the loaded film pack.

The MPU 220 is further provided with a display control section for causing the display unit 61 to display, when an exchange operation for the film pack 100 is made, a predetermined number corresponding to the number of films layered the film pack with a shielding plate, or a number that is obtained when one is subtracted from the number of residual films stored in the storage unit 210, according as it is detected or not that now discharged one is the shielding plate. This display control section and the storage unit 210 corresponds to the control section referred to the present invention.

According to the camera 10 thus constructed, when the front cover 11 is raised, voltage $V_B$ of the built-in battery 40 is applied via the power source switch 218 to a capacitor 211, a regulator 212 and the feeding motor 214. The regulator 212 stabilizes the entered voltage $V_B$ and creates voltage $V_c$. The created voltage $V_c$ is applied to a capacitor 213 and a power source terminal $V_{CC}$ of the MPU 220. Here, there is described a case where a photographer performs such an operation that he erroneously opens the rear cover 50 at the time when the layered films still remain in the film pack 100 loaded onto the camera 10, and he becomes aware of his error and then immediately closes the rear cover 50. Since the film pack detection switch 60 is closed, an 'L' level of signal is fed to the port PE1 of the MPU 220. Also, since the rear cover switch 51 is closed, an 'L' level of signal is also fed to the port PE2 of the MPU 220. In the state that an 'L' level of signal is fed to both the port PE1 and the port PE2, the MPU 220 stands by until the shutter button 34 is pushed.

The shutter button 34 is pushed in the state that the film pack 100 is properly loaded and the rear cover 50 is also properly closed. Then, an 'L' level of signal is fed to the port PE3 of the MPU 220. Upon receipt of the 'L' level of signal, the MPU 220 generates an 'H' level of signal from the port PE4. The 'H' level of signal is fed via the resistance 232 to the transistor 231, so that the transistor 231 turns on whereby current $I_M$ conducts through a path of the built-in battery 40→the power source switch 218→the feeding motor 214→the resistance 235→transistor 231→the ground GND. Thus, the feeding motor 214 rotates to start a discharge of films. Since the current $I_M$ conducts through the resistance 235, a voltage (potential) by the product of the value of the resistance 235 and the current $I_M$ is generated between both the ends of the resistance 235. The voltage thus generated is fed to the operational amplifier 236 to be amplified with a predetermined gain, and then fed to the AD conversion input terminal AD of the MPU 220. In the MPU 220, the entered voltage is subjected to an AD conversion to obtain a digital value $D_F$. The digital value $D_F$ corresponds to the magnitude of the load in the film discharge sequence shown in FIG. 4. The MPU 220 has a digital value $D_{TH}$ corresponding to the threshold shown in FIG. 4. In the MPU 220, the digital value $D_F$ is compared with the digital value $D_{TH}$. Since the digital value $D_F$ is smaller than the digital value $D_{TH}$, the display control section of the MPU 220 causes the display unit 61 to display the number of films that is obtained when one is subtracted from the number of residual films accommodated in the film pack. This number of films is stored in the storage unit 210.

On the other hand, in the event that the shutter button is depressed in a state that a new film pack 100 is loaded and the rear cover 50 is closed, the current $I_M$ conducts through the path which is the same as one mentioned above, so that the feeding motor 214 rotates to start the discharge of the shielding plate, and a voltage is generated between both the ends of the resistance 235. This voltage is fed via the operational amplifier 236 to the AD conversion input terminal AD of the MPU 220, so that the voltage is subjected to the AD conversion in the MPU 220 and whereby the digital value $D_s$ is created. Further, in the MPU 220, the digital value $D_s$ is compared with the digital value $D_{TH}$. The digital value $D_s$ corresponds to the load in the shield plate discharge sequence. On the other hand, the digital value $D_{TH}$ corresponds to the threshold shown in FIG. 4. Thus, the digital value $D_s$ is larger than the digital value $D_{TH}$. Accordingly, it is detected that the now discharged one is the shielding plate, and the display control section of the MPU 220 causes the display unit 61 to display the number of films accommodated in the new film pack. Further, this number of films is stored in the storage unit 210.

In this manner, according to the camera 10 of the first embodiment, in the event that the new film pack 100 is loaded and the rear cover 50 is closed, the number of films accommodated in the new film pack is displayed on the display unit 61. On the other hand, in the event that the rear cover 50 is once opened at the time when the layered films still remain in the film pack 100, and then closed, the number of residual films is displayed on the display unit 61. Accordingly, it happens, as in the conventional camera, no such a matter that the number of residual films, which is actually capable of being photographed, is different from the number of residual films, which is displayed on the display unit. Thus, it is possible to perform a proper display control.

Incidentally, according to the first embodiment, there is explained an example in which to detect the shielding plate of the loaded film pack, the operational amplifier 236 is used to detect a current $I_M$ conducting through the feeding motor 214, and the detected current is subjected to the AD conversion by the operational amplifier 236. However, the present invention is not restricted to this embodiment. It is acceptable that the current $I_M$ conducting through the feeding motor 214 is converted into 'H' level or 'L' level of signal by a comparator and the converted signal is fed to the port of the MPU 220.

Figure 6:
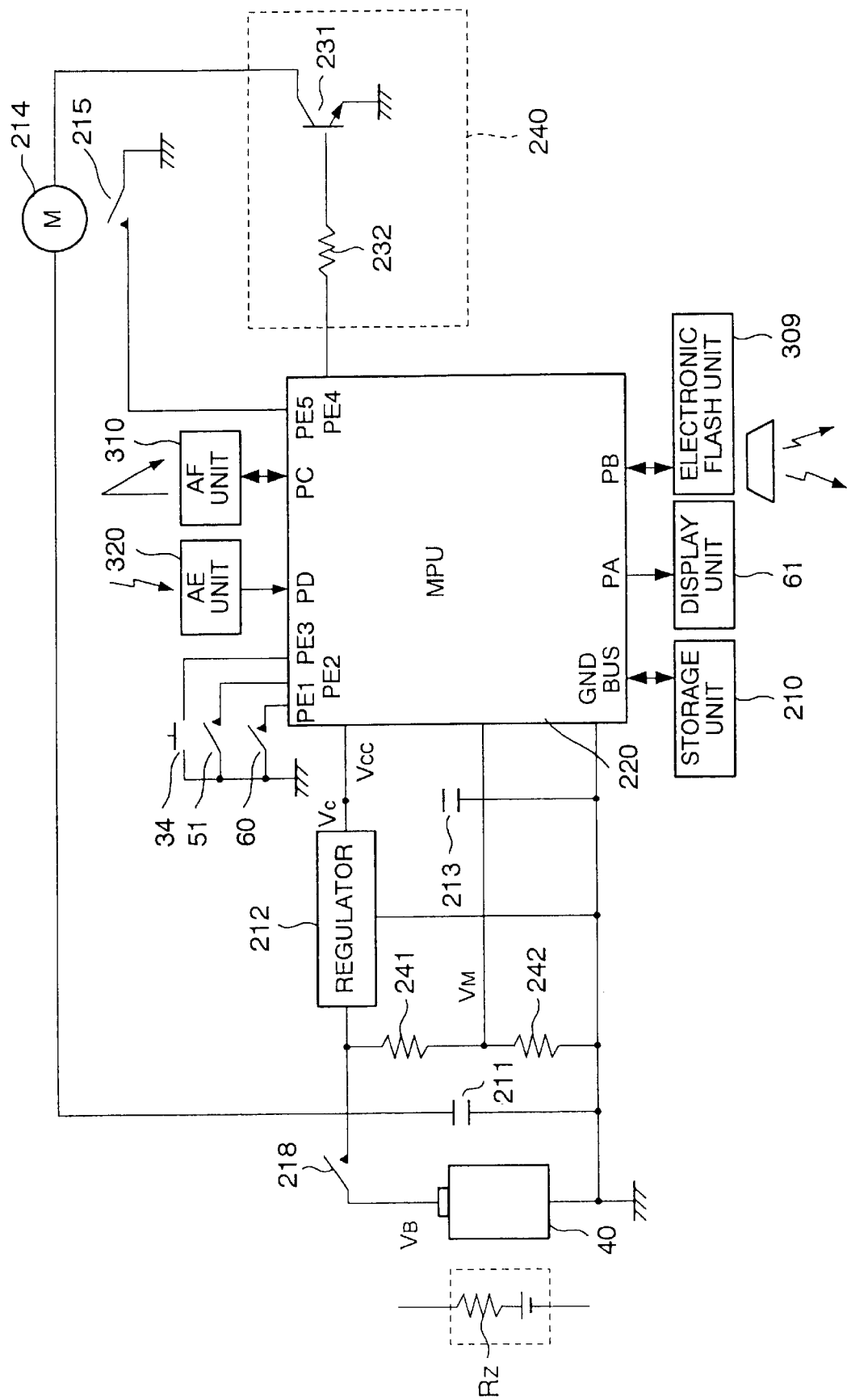
FIG. 6 is a circuit diagram of a camera of a second embodiment of the present invention.

FIG. 6 is a circuit diagram of a camera of a second embodiment of the present invention.

In FIG. 6, the same reference numbers denote the same parts as those of FIG. 5, and the redundant explanation will be omitted.

According to the circuit structure shown in FIG. 5, the shielding plate of the loaded film pack is detected in accordance with the current conducting through the feeding motor 214, and a control for the display and the like is performed in accordance with the detection result. On the other hand, according to the circuit structure shown in FIG. 6, the shielding plate of the loaded film pack is detected in accordance with an amount of voltage drop of a voltage appearing between both the terminals of the built-in battery 40, and a control for the display and the like is performed in accordance with the detection result.

Since the built-in battery 40 has an internal impedance $R_Z$, the voltage $V_B$ between both the terminals of the built-in battery 40 is more lowered, as the larger load is driven. Accordingly, the voltage $V_B$ between both the terminals of the built-in battery 40 is more lowered in the event that the load in the shield plate discharge sequence is driven, as compared with a case where the load in the film discharge sequence is driven. The present embodiment of the present invention has been made in view of the above-mentioned point. According to the present embodiment, there is provided a circuit structure that a resister 241 and a resister 242 are connected in series between both the ends of the capacitance 211 to which the voltage $V_B$ of the built-in battery 40 is applied, and the connected point is connected to the AD conversion input terminal AD of the MPU 220. When such a circuit structure is adopted to measure an amount of voltage drop of the voltage $V_B$ between both the terminals of the built-in battery 40 by the AD conversion section of the MPU 220, it is acceptable to provide a control for causing the display unit 61 to display a predetermined number corresponding to the number of films layered the film pack with a shielding plate, or a number that is obtained when one is subtracted from the number of residual films stored in the storage unit 210, according as it is detected or not that now discharged one is the shielding plate.

Figure 7:
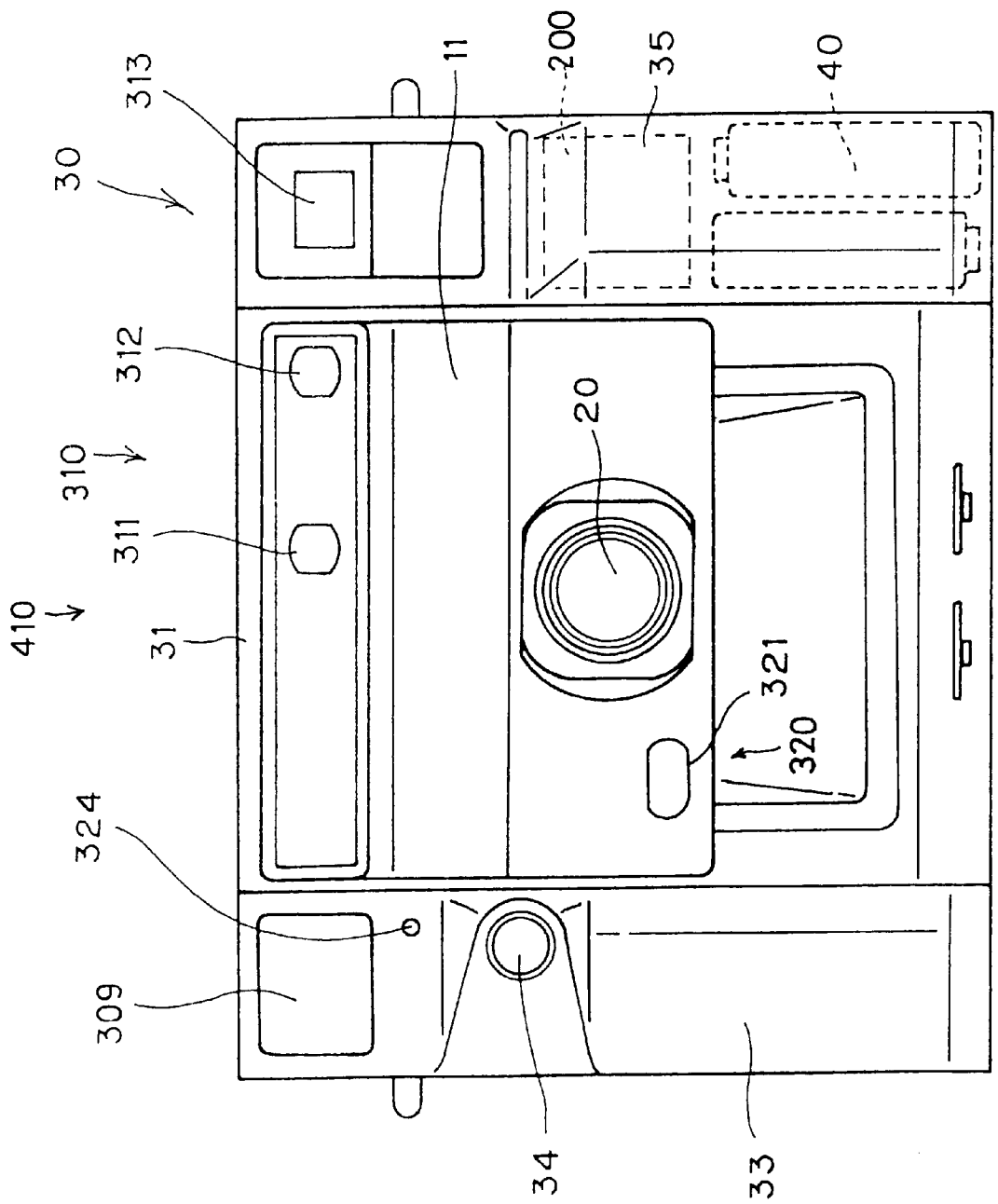
FIG. 7 is a front view showing an external appearance of a camera according to a third embodiment of the present invention.
Figure 8:
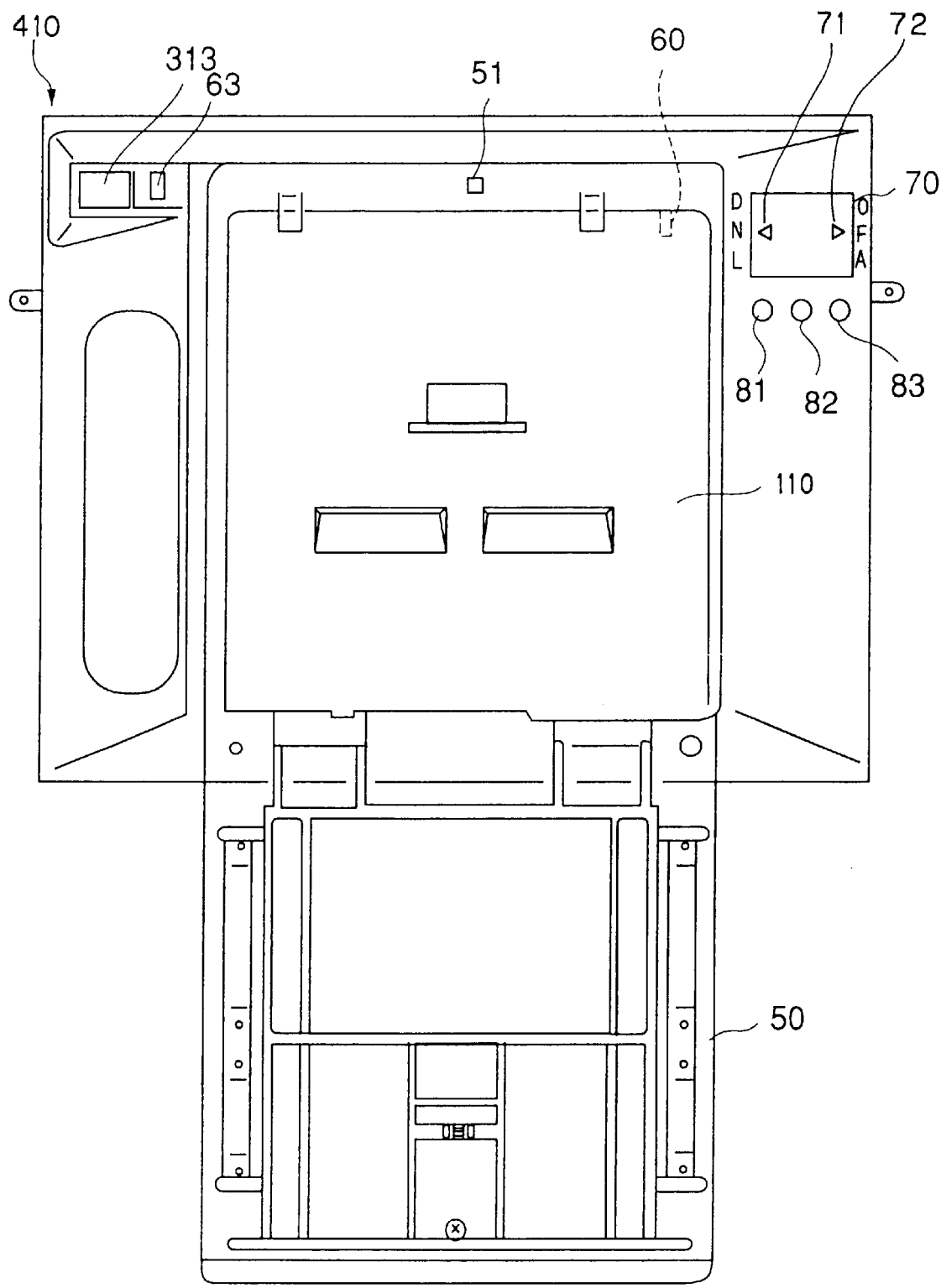
FIG. 8 is a rear elevation of the camera shown in FIG. 7 in which a rear cover is opened.

FIG. 7 is a front view showing an external appearance of a camera according to a third embodiment of the present invention. FIG. 8 is a rear elevation of the camera shown in FIG. 7 in which the rear cover is opened.

In FIGS. 7 and 8, the same reference numbers denote the same parts as those of FIG. 1.

In a camera 410, as compared with the camera 10 shown in FIG. 1, there are omitted the slide switch 322 for applying a filter effect to the AE window 321, and the slide switch 323 to be used at the time of self-timer photography. As shown in FIG. 8, a film pack 110, which will be described, is loaded on the camera 410. Further, there is provided a display unit 60 at the right of the film pack detection switch 60. At the lower portion of a display unit 70, there are provided a self-timer switch 81, an exposure correction switch 82 and an electronic flash control switch 83.

The self-timer switch 81 is for setting up a time for self-timer photography. When the self-timer switch 81 is pushed once, a time for self-timer is set up, and a pattern (not illustrated), which indicates that the time set up is performed, is displayed on the display unit 70. And when the self-timer switch 81 is pushed again, the set up time is released, and the patter is erased in display.

The exposure correction switch 82 is for indicating a degree of an exposure correction. Whenever the exposure correction switch 82 is depressed, a cursor 71 displayed on the display unit 70 is shifted to the positions of characters D (darken)→N (normal)→L(light), which are printed at the left of the display unit 70.

The electronic flash control switch 83 is for controlling an emission of electronic flash light. Whenever the electronic flash control switch 83 is depressed, a cursor 72 displayed on the display unit 70 is shifted to the positions of characters O (on)→F (off)→A(auto), which are printed at the right of the display unit 70.

The display unit 70 displays the number of films and a film speed as well as the above-mentioned patterns, and the cursors 71 and 72.

Figure 9:
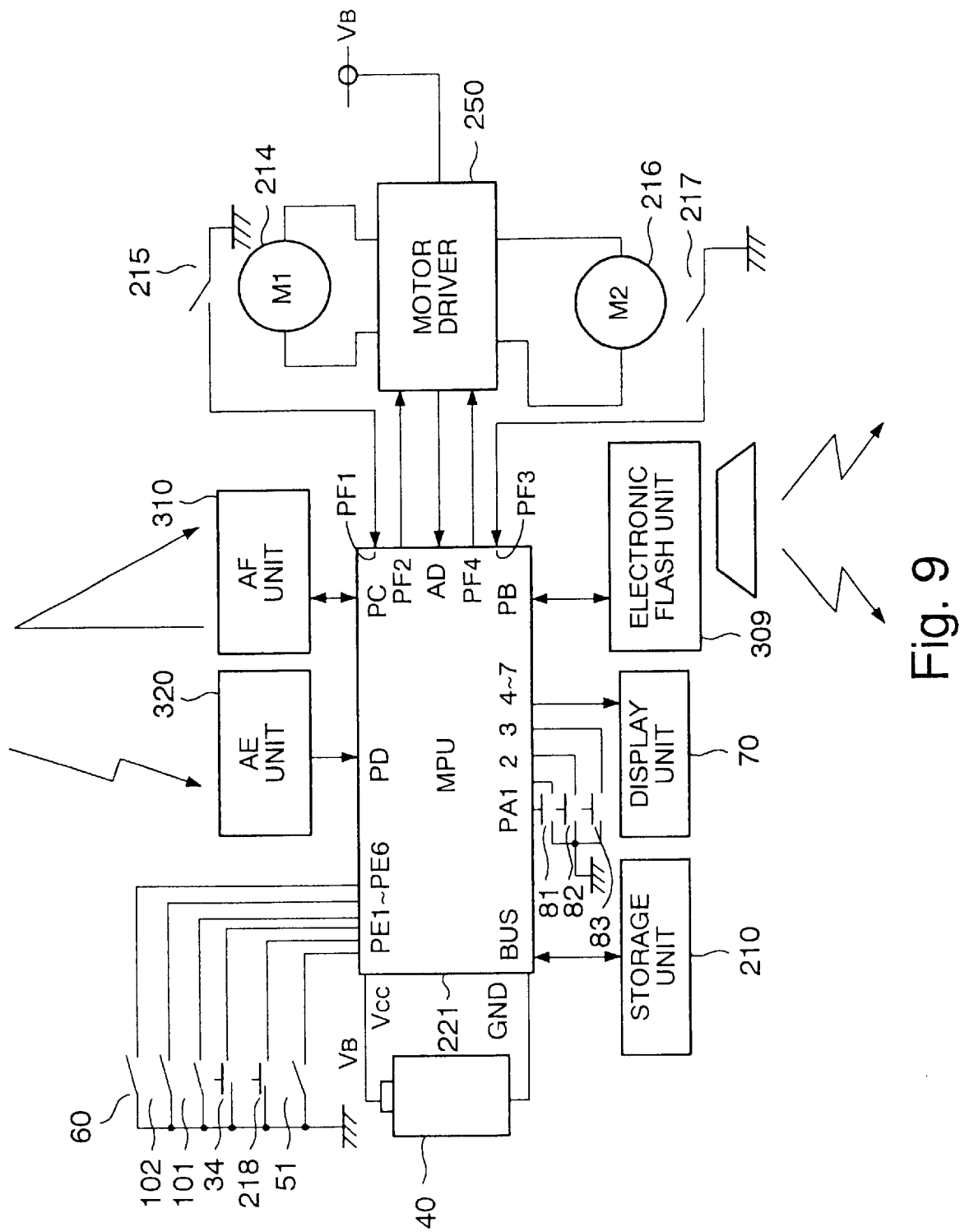
FIG. 9 is a circuit diagram of the camera of the third embodiment.

FIG. 9 is a circuit diagram of the camera of the third embodiment.

FIG. 9 shows an MPU 221 connected to the built-in battery 40. Storage section 210 is connected to a bus terminal BUS of the MPU 221. The storage section 210 is provided with a display-processing counter (not illustrated) for storing the number of films. Connected to ports PA1, PA2 and PA3 of the MPU 221 are a self-timer switch 81, an exposure correction switch 82 and an electronic flash control switch 83, respectively. Connected to ports PA4 to PA7 of the MPU 221 is the display unit 70. Connected to ports PB, PC and PD of the MPU 221 are an electronic flash unit 309, an AF unit 310 and an AE unit 320, respectively. Further, Connected to ports PE1, PE2, PE3, PE4, PES, and PE6 of the MPU 221 are a rear cover switch 51, a power source switch 218, a shutter button 34, a first notch switch 101, a second notch switch 102, and a film pack detection switch 60, respectively. The first notch switch 101 and the second notch switch 102 corresponds to an example of a sensor for reading film information stored in the film pack, referred to in the present invention.

The MPU 221 is in a stand-by mode in a state that the front cover 11 is closed. When the front cover 11 is raised so that the power source switch 218 is closed, the port PE2 of the MPU 221 receives a 'L' level of signal so that the MPU 221 shifts to the usual operation mode. When the front cover 11 is closed, the MPU 221 shifts to the stand-by mode. Even in the state that the front cover 11 is closed, when the rear cover 50 is opened once and then closed after the film pack 110 is loaded, both the film pack detection switch 60 and the rear cover switch 51 are closed. As a result, the ports PE6 and PE1 of the MPU 221 receive a 'L' level of signal so that the MPU 221 shifts to the usual operation mode. Thus, as will be described later, discharge of the shielding plate or discharge of a film is performed, and thereafter the MPU 221 shifts to the stand-by mode.

A motor driver 250 is provided with transistors (not illustrated) each for driving a feeding motor 214 and a barrel driving motor 216. Those transistors are connected to the ports PF2 and PF4 of the MPU 221, respectively. A feeding switch 215 and a barrel switch 217 are connected to the ports PF1 and PF3 of the MPU 221, respectively. The feeding switch 215 is closed at the time when the feeding motor 214 rotates so that the shielding plate or a film is discharged. The barrel switch 217 is a switch for far-and-near switching, which is closed at the time when the barrel driving motor

216 rotates so that a lens arrives at a predetermined position. Connected to an AD conversion input terminal AD of the MPU 221 is an operational amplifier (not illustrated) for detecting a current conducting through the feeding motor 214. The film pack 110 is loaded on the camera 410 thus constructed.

Figures 10, 11:
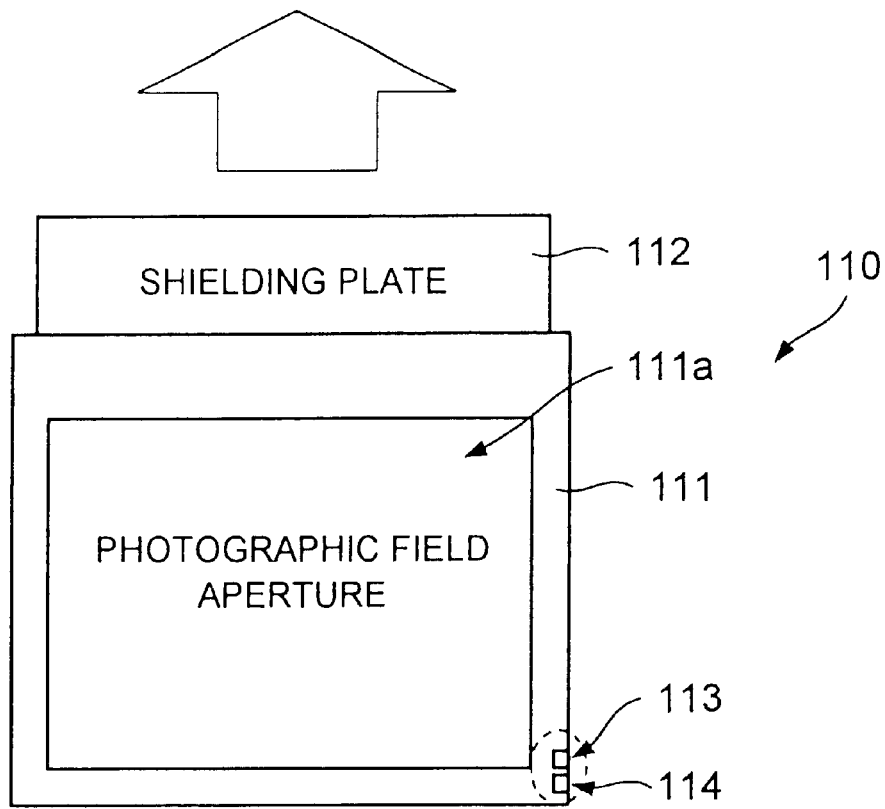
FIG. 10 is a schematic diagram of a film pack in its entirety.
FIG. 11 is a view showing combinations of signals based on a film speed notch provided on the film pack shown in FIG. 10 and film speeds associated with the combinations.

FIG. 10 is a schematic diagram of a film pack in its entirety. FIG. 11 is a view showing combinations of signals based on a film speed notch provided on the film pack shown in FIG. 10 and film speeds associated with the combinations.

The film pack 110 shown in FIG. 10 has such a structure that a plurality of instant photographic films is layered in a frame 111 having an aperture 111a in form of a photographic field, and the aperture 111a of the frame 111 is shut by a shielding plate 112. The shielding plate 112 and a film (not illustrated) are discharged in a direction A shown in FIG. 10. In the event that a film having a film speed other than ISO 400, ISO 800 and ISO 1600 is incorporated in the film pack 110, both first and second film speed notches 113 and 114 are formed at the side of the frame 111. In the event that a film having a film speed of ISO 400 is incorporated in the film pack 110, only the first film speed notch 113 is formed at the side of the frame 111. In the event that a film having a film speed of ISO 800 is incorporated in the film pack 110, only the second film speed notch 114 is formed at the side of the frame 111. In the event that a film having a film speed of ISO 1600 is incorporated in the film pack 110, none of the first film speed notch 113 and the second film speed notch 114 is formed at the side of the frame 111.

The first notch switch 101 and the second notch switch 102 are disposed adjacent to the portion of the frame 111 in which the first film speed notch 113 and the second film speed notch 114 is formed. In this manner, the first notch switch 101 and the second notch switch 102 are disposed at the same side of the frame 111. This feature makes it possible to simplify an arrangement and wiring for the first notch switch 101 and the second notch switch 102.

In the event that a film having a film speed other than ISO 400, ISO 800 and ISO 1600 is incorporated in the film pack 110, both first and second film speed notches 113 and 114 are formed at the side of the film pack 110. Thus, both the first notch switch 101 and the second notch switch 102 turn on, and as shown in FIG. 11, 'L' level of signals are outputted from the first notch switch 101 and the second notch switch 102. In the event that a film having a film speed of ISO 400 is incorporated in the film pack 110, only the first film speed notch 113 is formed at the side of the film pack 110. Thus, the first notch switch 101 and the second notch switch 102 turn on and turn off, respectively, and 'L' level of signal and 'H' level of signal are outputted from the first notch switch 101 and the second notch switch 102, respectively. In the event that a film having a film speed of ISO 800 is incorporated in the film pack 110, only the second film speed notch 114 is formed at the side of the film pack 110. Thus, the first notch switch 101 and the second notch switch 102 turn off and turn on, respectively, and 'H' level of signal and 'L' level of signal are outputted from the first notch switch 101 and the second notch switch 102, respectively. In the event that a film having a film speed of ISO 1600 is incorporated in the film pack 110, none of the first film speed notch 113 and the second film speed notch 114 is formed at the side of the film pack 110. Thus, both the first notch switch 101 and the second notch switch 102 turn off, and 'H' level of signals are outputted from the first notch switch 101 and the second notch switch 102.

Next, there will be described an operation of the camera 410 of the third embodiment referring to FIG. 9 and FIG. 12.

Figure 12:
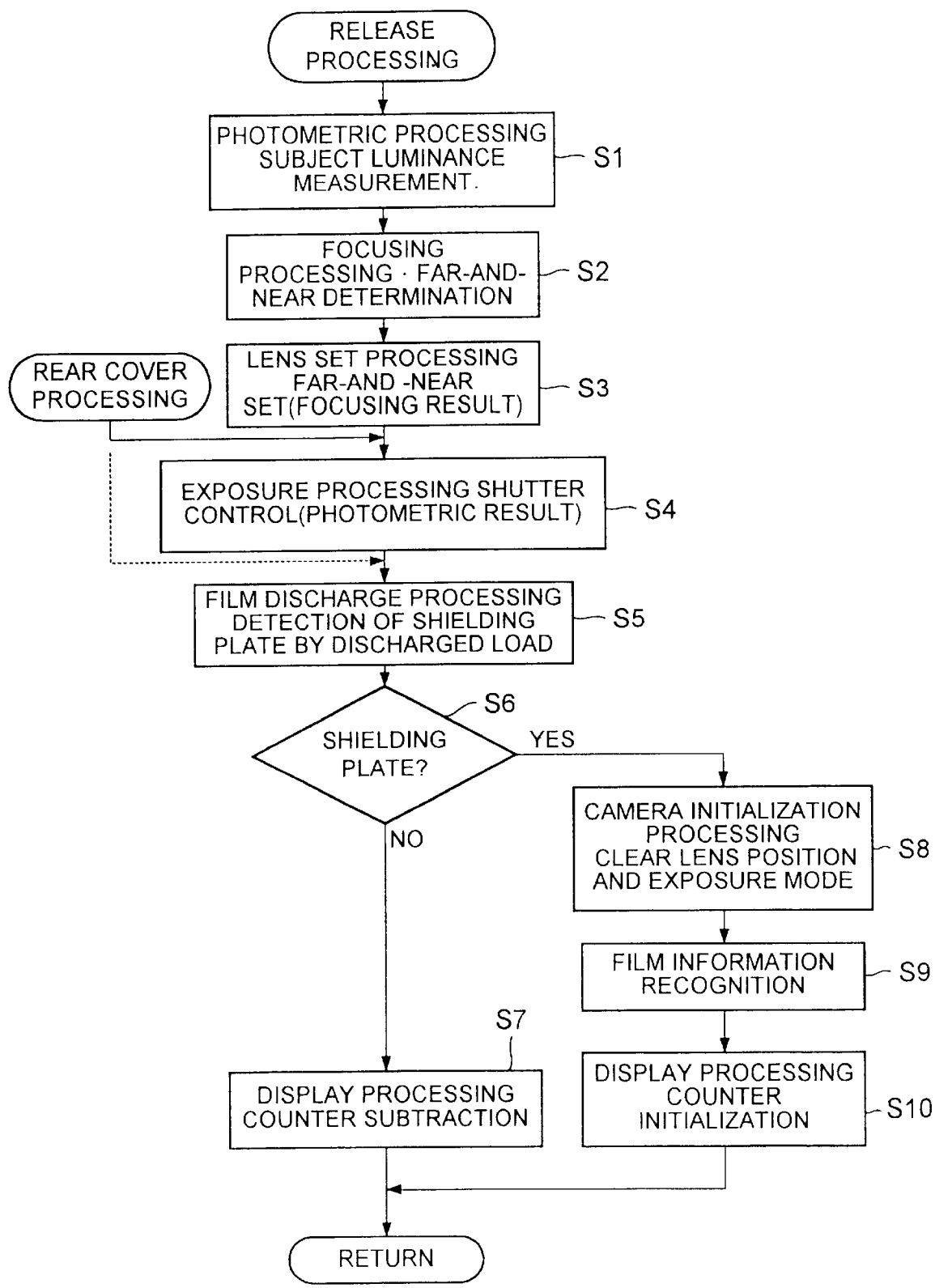
FIG. 12 is a flowchart useful for understanding a control routine in the camera of the third embodiment.

FIG. 12 is a flowchart useful for understanding a control routine in the camera of the third embodiment.

First, there will be described a case where a new file pack 110 is loaded in a state that the front cover 11 (cf. FIG. 7) is closed.

Even if the MPU 221 is in the stand-by mode, in which the front cover 11 is closed, when the rear cover 50 is once opened and then closed after the new film pack 110 is loaded, both the film pack detection switch 60 and the rear cover switch 51 are closed, so that an 'L' level of signal is fed to both the port PE6 and the port PE1 of the MPU 220, and a mode is shifted from the stand-by mode to the usual operational mode. Thus, of the control routines shown in FIG. 12, a routine for a rear cover closing processing is executed.

First, in a step S4, an exposure processing and a shutter control are performed. In the exposure processing, an electronic flash control mode is set up to an off-side, and a shutter is controlled by a dummy value. Then, the process goes to a step S5 in which a film discharge processing is performed. In the film discharge processing, an 'H' level of signal is outputted from the port PF2 of the MPU 221 shown in FIG. 9 to the motor driver 250, so that the feeding motor 214 rotates. Here, since the new film pack 110 is loaded, a discharge of the shielding plate is initiated, and in a similar fashion to that explained referring to FIG. 5, an analog signal according to the load of the shielding plate is fed via the operational amplifier (not illustrated) to the AD conversion input terminal AD of the MPU 221 and is subjected to the AD conversion in the MPU 221. Thus, it is detected that now discharged one is the shielding plate.

Next, in a step S6, it is determined whether the shielding plate is concerned. Here, it is determined that the shielding plate is concerned, and thus the process goes to a step S8 in which an initialization processing for a camera is performed. For the initialization processing, a lens position is set up to a position (a short-range view side) suitable for an instant camera which is often associated with a short-range view photograph. The electronic flash control mode is set up to an auto-side, and the exposure correction is set up to a normal-side, so that the exposure mode is cleared.

Next, in a step S9, the MPU 221 reads the signals on the ports PE4 and PE5 and causes the storage unit 210 to store a film speed. The camera 410 is a camera of a system capable of receiving the photography-possible number of films. In the camera 410, the photography-possible number of films is stored in the display-processing counter of the storage unit 210 through means not illustrated. In this manner, the camera 410 recognizes film information comprising the film speed and the number of films. Next, the process goes to a step S10 in which the display unit 70 displays the number of films layered in the new film pack 110 and the film speed. Further, in order to inform an operator of the state of the initially set up exposure correction (normal) and the electronic flash control mode (auto), the cursors 71 and 72 (cf. FIG. 8) of the display unit 70 are shifted to characters N and A, respectively, and thus the routine is terminated. Thereafter, the MPU 221 shifts to the stand-by mode. In this manner, when the new film pack 110 is loaded onto the camera 410 and the rear cover 50 is closed, the presence of the shielding plate is detected, and the initial set up for the camera 410 is performed in accordance with the detection result. Therefore, the operation of an operator is simplified and an operational efficiency is enhanced. Further, at the time point when the rear cover 50 is closed, the shielding plate is discharged, and thus an operator can immediately perform photography. Accordingly, it is possible to prevent an operator from missing the shutter chance.

Next, to perform photography, the front cover 11 is raised. When the front cover 11 is raised, the power source switch 218 is closed, so that a 'L' level of signal is fed to the port PE2 of the MPU 221. Upon receipt of the 'L' level of signal, the MPU 221 shifts from the stand-by mode to the usual operational mode. When the shutter button 34 is depressed, a 'L' level of signal is fed to the port PE3 of the MPU 221. Since the film pack detection switch 60 is closed, the 'L' level of signal is fed to the port PE6 of the MPU 221. Further, since the rear cover switch 51 is also closed, the 'L' level of signal is fed to the port PE1 of the MPU 221. Upon receipt of the 'L' level of signals, the MPU 221 executes a routine for a release processing of the control routines shown in FIG. 12.

First, in a step S1, a luminance of a camera subject is measured by photometry means, and a shutter control operation is performed in accordance with a setting condition of the film speed, the exposure correction value, and the electronic flash control mode, which are initially set up in the above-mentioned rear cover close processing routine, and also a decision of needs of emission of the electronic flash light is performed.

Next, in a step S2, a subject distance is computed by focusing means to perform an arithmetic operation for a lens position control, and the process goes to a step S3.

In the step S3, a shooting lens is moved to a predetermined position in accordance with an operation result in the step S2. In detail, an 'H' level of signal is outputted from the port PF4 of the MPU 221 shown in FIG. 9, so that the barrel driving motor 216 rotates in accordance with the operation result and thus the shooting lens is moved to a predetermined position.

In the step S4, a shutter control is performed in accordance with the photometry result in the step S1, and in the event that an emission of the electronic flash light is performed, the light emission control is also performed. Next, the process goes to the step S5 in which the film discharge processing is performed. In the film discharge processing, an 'H' level of signal is outputted from the port PF2 of the MPU 221 shown in FIG. 9 to the motor driver 250, so that the feeding motor 214 rotates to start a discharge of films. In a similar fashion to that explained referring to FIG. 5, an analog signal according to the load of the films is fed via the operational amplifier (not illustrated) to the AD conversion input terminal AD of the MPU 221 and is subjected to the AD conversion in the MPU 221. Thus, it is detected that now discharged one is the film.

Next, in the step S6, it is determined whether the shielding plate is concerned. Here, it is determined that the film is concerned, and thus the process goes to a step S7 in which '1' is subtracted from the display processing counter. Then, this routine is terminated. In this manner, the photography is performed.

There is a case where the rear cover 50 is once opened at the time when the layered films still remain in the film pack 100, and then closed. When the rear cover 50 is closed, the above-mentioned rear cover close processing routine is executed. In this case, since a top layer of film, which is layered in the film pack, is exposed, the film is discharged in the step S5, and in the step S6 it is decided that the film is concerned, and then the process goes to the step S7 in which the value of the display processing counter is subtracted by '1'. Thus, this routine is terminated. In this manner, the exposed film is discharged.

Incidentally, according to the present embodiment, as mentioned above, from the viewpoint that the shutter chance is not missed, there is provided that the shielding plate is discharged at the time when the rear cover is closed. For this reason, for example, even in the event that a film pack, which has a film speed different from a film pack having a desired film speed, is loaded, and an operator is aware of his error before photography and wishes to exchange the film pack for a film pack having a desired film speed through opening and closing operations of the rear cover, the film is exposed. Thus, in practice, it is not permitted to perform the opening and closing operations of the rear cover until the films are completely used. In view of the foregoing, it is acceptable to provide such a control that a discharge of the shielding plate is not performed at the time when the rear cover is closed, but is performed in the release processing routine that is carried out when the shutter button is depressed. This control makes it possible to freely perform the opening and closing operations of the rear cover, since the shielding plate is not discharged at the time when the new film pack is loaded.

What is claimed is:

1. A camera wherein a plurality of instant photographic films are layered, a film pack having a shielding plate for shielding the layered films is loaded, the shielding plate is first discharged by a power of a built-in battery and thereafter a top layer of film of the layered films is exposed in accordance with a photographic operation, and an exposed film is discharged while developed, said camera comprising:

a shielding plate detection section for detecting a presence of the shielding plate of the loaded film pack; and a control section for performing a control in accordance with a detection result by said shielding plate detection section.

2. A camera according to claim 1, wherein said shielding plate detection section detects whether one discharged by a present discharge operation is the shielding plate, in accordance with the shielding plate of the loaded film pack or a load at the time of a discharge operation for the film.

3. A camera according to claim 1, further comprising a display unit for displaying a state of the camera, wherein said control section controls a display content of said display unit in accordance with a detection result by said shielding plate detection section.

4. A camera according to claim 2, further comprising a display unit for displaying the number of residual films within the loaded film pack, wherein said control section comprises a storage section for storing the number of residual films within the film pack before a film pack exchange operation, and a display control section for causing said display unit to display a predetermined number corresponding to the number of films layered within the film pack having the shielding plate, or a number in which one is subtracted from the number of residual films stored in said storage section, according as said shielding plate detection section detects that now discharged one is the shielding plate, in a case where the film pack exchange operation is made.

5. A camera according to claim 1, wherein said camera adapts for loading thereonto a film pack recording film information related to an incorporated film, and wherein said camera has a sensor for reading the film information recorded on the film pack, and said control section causes said sensor to read the film information upon receipt of that said shielding plate detection section detects the shielding plate.

6. A camera according to claim 1, wherein said control section performs an initialization on at least one portion of element of said camera upon receipt of that said shielding plate detection section detects the shielding plate.

* * * * *